United States Patent
Yoshida et al.

(10) Patent No.: US 8,450,885 B2
(45) Date of Patent: May 28, 2013

(54) COOLANT-COOLED LINEAR MOTOR

(75) Inventors: Shusaku Yoshida, Kitakyushu (JP);
Toshiyuki Yamagishi, Kitakyushu (JP);
Kazuya Watanabe, Kitakyushu (JP);
Masahiko Tanabe, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 197 days.

(21) Appl. No.: 12/984,123

(22) Filed: Jan. 4, 2011

(65) Prior Publication Data
US 2011/0181130 A1    Jul. 28, 2011

(30) Foreign Application Priority Data

Jan. 26, 2010 (JP) .................... 2010-014491
Feb. 25, 2010 (JP) .................... 2010-040411
Aug. 24, 2010 (JP) .................... 2010-187460

(51) Int. Cl.
*H02K 41/03* (2006.01)

(52) U.S. Cl.
USPC .............. 310/12.29; 310/58; 310/59

(58) Field of Classification Search
USPC ............. 310/12.29, 12.01–12.33, 52–64
See application file for complete search history.

(56) References Cited

FOREIGN PATENT DOCUMENTS
JP    2006-121813    5/2006

*Primary Examiner* — Tran Nguyen
*Assistant Examiner* — Leda Pham
(74) *Attorney, Agent, or Firm* — Ditthavong Mori & Steiner, P.C.

(57) ABSTRACT

In a coolant-cooled linear motor includes an armature including armature windings and a cooling jacket arranged to surround the armature windings, the cooling jacket unit includes four cooling jackets defining four side faces parallel to the extension direction of the armature and two end blocks defining two opposite end faces in the extension direction of the armature, the cooling jackets and the end blocks being connected to one another in a box shape. Each of the cooling jackets has an internal space to be supplied with a coolant; and a field magnet unit includes a yoke made of a ferromagnetic material and permanent magnets arranged in the yoke, one of the armature and the field magnet unit making relative movement with respect to the other.

20 Claims, 11 Drawing Sheets

COOLANT-COOLED LINEAR MOTOR

FIELD OF THE INVENTION

The present invention relates to a coolant-cooled linear motor.

BACKGROUND OF THE INVENTION

Conventionally, there has been proposed a linear motor used in factory automation equipments to drive a stage of a semiconductor exposure device or a liquid crystal exposure device or to feed a table of a machine tool. In order to achieve an increase in speed and accuracy of feeding or processing operations, the linear motor includes permanent magnets making up a field magnet, and an armature having armature windings facing the magnetic pole surfaces of the permanent magnet in a magnetic space.

The armature of the linear motor includes armature windings, a base plate for positioning and fixing the armature windings in place, a frame for fixing the base plate in place and a cover for sealing the frame. The frame includes a large coolant pool formed in the central area thereof. The armature windings are accommodated within the coolant pool. The side surfaces of the coolant pool are sealed by the cover. The frame is provided with a coolant inlet and a coolant outlet. Within the core of the frame, there are formed a coolant incoming path and a coolant outgoing path, which communicate with the coolant inlet and the coolant outlet, respectively (see, e.g., Japanese Patent Application Publication No. 2006-121813).

SUMMARY OF THE INVENTION

In accordance with an aspect of the present invention, there is provided a coolant-cooled linear motor including an armature including armature windings and a cooling jacket arranged to surround the armature windings, the cooling jacket unit including four cooling jackets defining four side faces parallel to the extension direction of the armature and two end blocks defining two opposite end faces in the extension direction of the armature, the cooling jackets and the end blocks being connected to one another in a box shape, each of the cooling jackets having an internal space to be supplied with a coolant; and a field magnet unit including a yoke made of a ferromagnetic material and permanent magnets arranged in the yoke, one of the armature and the field magnet unit making relative movement with respect to the other.

In accordance with another aspect of the present invention, there is provided a coolant-cooled linear motor including an armature including armature windings and a cooling jacket arranged to surround the armature windings, the cooling jacket unit including three cooling jackets defining three side faces parallel to the extension direction of the armature, a base of flat plate shape defining one side face parallel to the extension direction of the armature and two end blocks defining two opposite end faces in the extension direction of the armature, the cooling jackets and the end blocks being connected to one another in a box shape, each of the cooling jackets having an internal space to be supplied with a coolant; and a field magnet unit including a yoke made of a ferromagnetic material and permanent magnets arranged in the yoke, one of the armature and the field magnet unit making relative movement with respect to the other.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will now be described with reference to the accompanying drawings which form a part hereof.

First Embodiment

Figure 1:
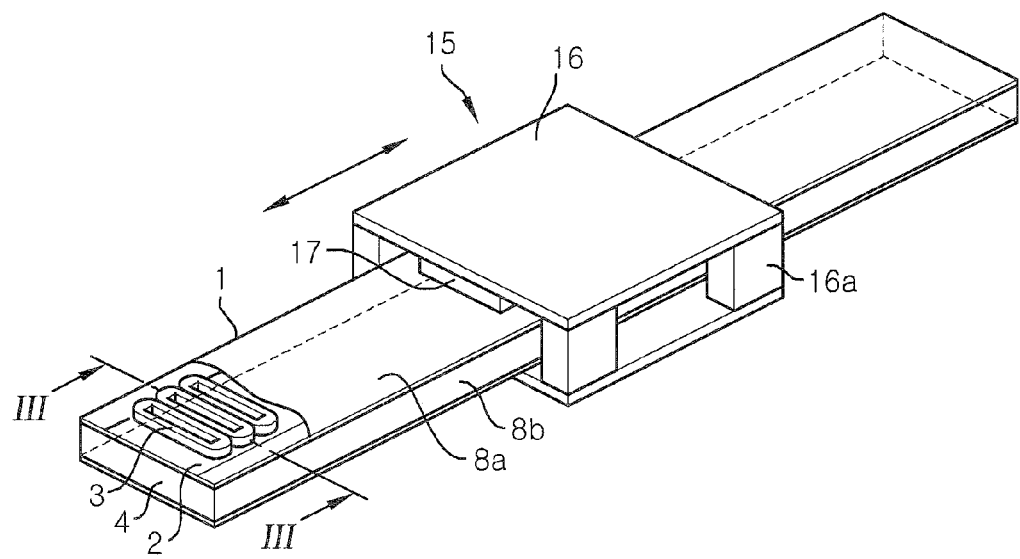
FIG. 1 is a perspective view showing a coolant-cooled linear motor in accordance with a first embodiment of the present invention.

FIG. 1 is a perspective view showing a coolant-cooled linear motor in accordance with a first embodiment of the present invention. In FIG. 1, reference numeral "1" designates an armature, reference numeral "2" designates a base plate, reference numeral "3" designates armature windings, reference numeral "8" designates a cooling jacket unit, reference numeral "15" designates a field magnet unit, reference numeral "16" designates a yoke, reference numeral "16a" designates yoke fixing plates, and reference numeral "17" designates field-generating permanent magnets.

Referring to FIG. 1, the coolant-cooled linear motor includes an armature 1 (a so-called flat type linear motor armature) and a field magnet unit 15. The armature 1 includes a base plate 2, armature windings 3 fixed to the base plate 2 and a cooling jacket unit 8 arranged to surround the armature windings 3. The field magnet unit 15 is arranged to surround the cooling jacket unit 8 of the armature 1 with an air gap. The field magnet unit 15 includes a yoke 16 made of a ferromagnetic material and a plurality of field-generating permanent magnets 17 arranged along the moving direction of the linear motor and fixed to the yoke 16. The yoke 16 is supported by the yoke fixing plates 16a.

The linear motor shown in FIG. 1 has a configuration in which the armature 1 serves as a fixed unit and the field magnet unit 15 serves as a movable unit capable of moving relative to the armature 1. Alternatively, the armature 1 may be used as a movable unit with respect to the field magnet unit 15 used as a fixed unit.

Figure 2A:
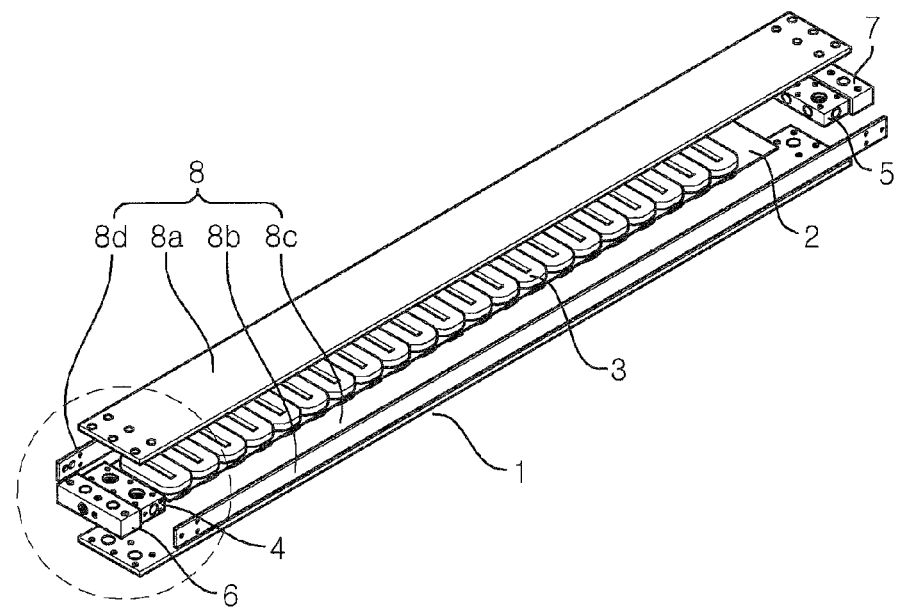
FIG. 2A is an exploded perspective view showing an armature employed in the coolant-cooled linear motor of the first embodiment.
Figure 2B:
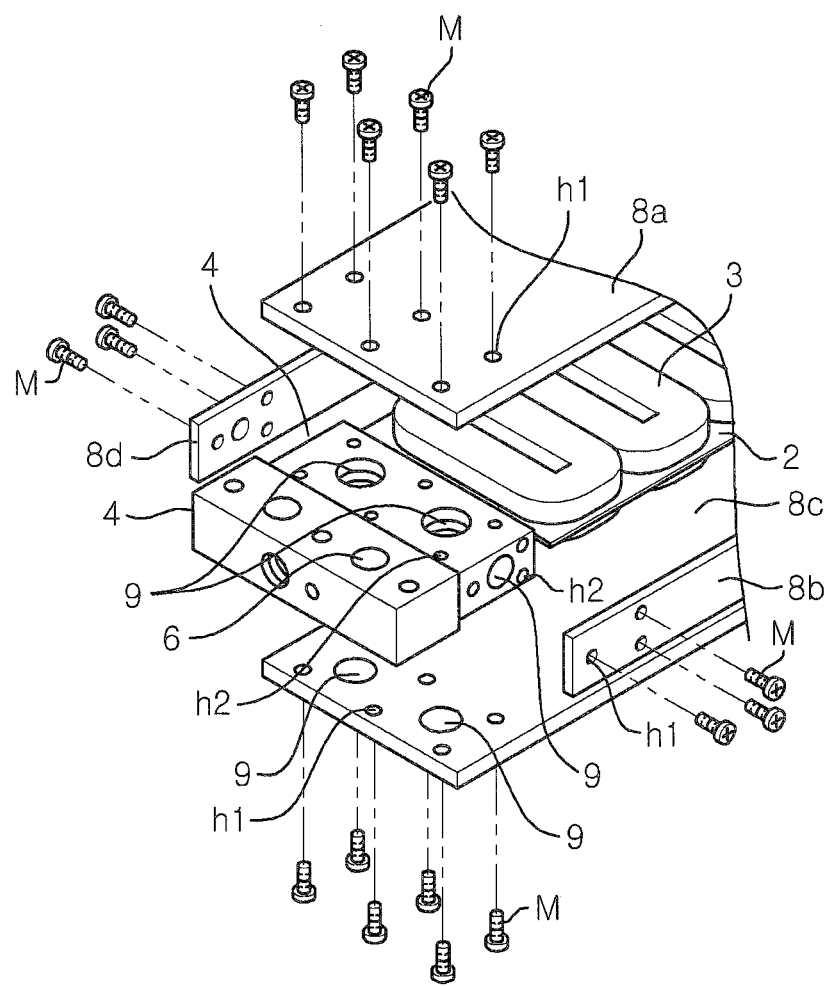
FIG. 2B is a partially enlarged perspective view of the area designated by "A" in FIG. 2A.

FIG. 2A is an exploded perspective view showing the armature employed in the coolant-cooled linear motor of the first embodiment, and FIG. 2B is a partially enlarged perspective view of the area designated by "A" in FIG. 2A.

As shown in FIGS. 2A and 2B, the cooling jacket unit 8 includes first to fourth cooling jackets 8a, 8b, 8c and 8d arranged to surround the armature windings 3 and define four side faces of the armature 1 parallel to the extension direction of the armature 1 and first and second blocks 4 and 5 defining two opposite end faces of the armature 1 in the extension direction of the armature 1. Each of the cooling jackets 8a, 8b, 8c and 8d has an inner and an outer wall defining an internal space to which a coolant is supplied. The cooling jacket unit 8 is formed to have a box-like structure by arranging the first to fourth cooling jackets 8a, 8b, 8c and 8d and the first and second blocks 4 and 5 in a mutually opposing relationship. The cooling jacket unit 8 is formed into a flat shape and made of, e.g., fiber-reinforced plastic containing glass fibers or carbon fibers (i.e., carbon fiber reinforced plastic (CFRP) or glass fiber reinforced plastic (GFRP)), ceramics or a nonmagnetic metal such as a nonmagnetic stainless steel, thereby making the cooling jacket unit 8 highly rigid.

Specifically, with the box-shaped cooling jacket unit 8 shown in FIG. 2A, the first block 4 having a coolant inlet and the second block 5 having a coolant outlet 7 are provided at the longitudinal opposite end portions of the first to fourth cooling jackets 8a, 8b, 8c and 8d so that a coolant can flow from one end portion of the cooling jacket unit 8 toward the other end thereof (in the extension direction of the armature 1). The entrances of the coolant flow paths of the first to fourth cooling jackets 8a, 8b, 8c and 8d communicate with the coolant inlet 6 of the first block 4, while the exits of the coolant flow paths of the first to fourth cooling jackets 8a, 8b, 8c and 8d communicate with the coolant outlet 7 of the second block 5. Through-holes h1 of the first to fourth cooling jackets 8a, 8b, 8c and 8d are aligned with threaded holes h2 formed on the upper, lower, left and right surfaces of the first block 4 and the second block 5. Screws M are inserted through the through-holes h1 and tightened into the threaded holes h2, thereby fixing the first to fourth cooling jackets 8a, 8b, 8c and 8d to the first block 4 and the second block 5.

As shown in FIG. 2B, O-rings 9 are arranged between the first block 4 and the first to fourth cooling jackets 8a, 8b, 8c and 8d to secure fluid-tightness of the coolant flow paths around the coolant inlet 6.

Similarly, O-rings 9 are arranged between the second block 5 and the first to fourth cooling jackets 8a, 8b, 8c and 8d to secure fluid-tightness of the coolant flow paths around the coolant outlet 7 shown in FIG. 2A. Any seal members other than the O-rings may be used to increase the fluid-tightness of the coolant flow paths.

Just like the first to fourth cooling jackets 8a, 8b, 8c and 8d, the first block 4 with the coolant inlet 6 and/or the second block 5 with the coolant outlet 7 may be formed in a flat shape. Moreover, the first block 4 and the second block 5 may not be provided with the coolant inlet and the coolant outlet but may merely serve as fixing members for keeping the cooling jacket unit 8 in a box-like shape. In this case, coolant inlets and coolant outlets are provided to each of the first to fourth cooling jackets 8a, 8b, 8c and 8d so that the coolant can flow through the first to fourth cooling jackets 8a, 8b, 8c and 8d independently.

Next, description will be made on the operation of the coolant-cooled linear motor.

Referring to FIG. 2A, the coolant introduced from the coolant inlet 6 of the first block 4 flows through the coolant flow paths formed in the first block 4 and is distributed to the first to fourth cooling jackets 8a, 8b, 8c and 8d surrounding the armature windings 3 and defining four side faces parallel to the extension direction of the armature 1. The coolant flowing through the first to fourth cooling jackets 8a, 8b, 8c and 8d is collected in the second block 5 and is discharged through the coolant outlet 7. In this process, the heat generated in the armature windings 3 is dissipated by the coolant flowing through the first to fourth cooling jackets 8a, 8b, 8c and 8d.

The conventional coolant-cooled linear motor is disadvantageous in that the insulation reliability of the linear motor is affected by the insulation performance of a coolant itself and further in that the winding space is sacrificed due to the use of a frame for holding the armature windings in place. In the present embodiment, however, there is no need to use a frame for holding the armature windings in the central area. This proportionately increases the space for accommodation of the armature windings. Unlike the conventional linear motor, the cooling jackets of the cooling jacket unit for covering the armature windings are arranged on four side faces of the armature 1 so that all the four side faces parallel to the extension direction of the armature can be cooled with enhanced cooling efficiency. This makes it possible to increase the temperature reduction performance of the coolant-cooled linear motor. This also contributes in improving the linear motor performance and the thrust force density.

In addition, it is possible to avoid reduction in the rigidity of the cooling jacket unit by using a material such as CFRP, ceramics or nonmagnetic stainless steel.

Second Embodiment

Figure 3:
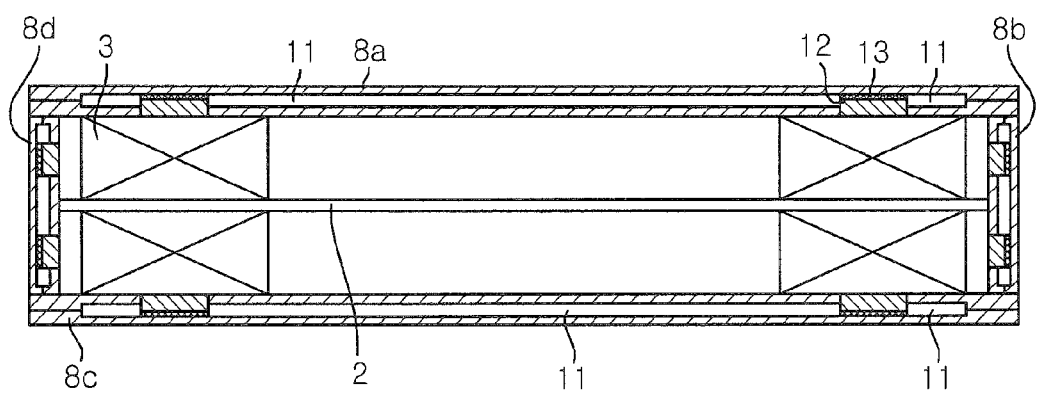
FIG. 3 is a section view showing an armature of a coolant-cooled linear motor in accordance with a second embodiment of the present invention.

FIG. 3 is a section view taken along line III-III in FIG. 1, showing an armature of a coolant-cooled linear motor in accordance with a second embodiment of the present invention.

Each of the cooling jackets 8a, 8b, 8c and 8d has a coolant flow path 11 defined therein. Moreover, each of the cooling jackets 8a, 8b, 8c and 8d includes first reinforcing members 12 arranged on the inner wall thereof and second reinforcing members 13 arranged on the outer wall thereof. The first reinforcing members 12 are greater in thermal conductivity than the walls of the cooling jackets 8a, 8b, 8c and 8d. The second reinforcing members 13 are lower in thermal conductivity than the first reinforcing members 12.

The first reinforcing members 12 and the second reinforcing members 13 are fixed to the cooling jackets 8a, 8b, 8c and 8d by bonding or other fixing methods. In this regard, the first reinforcing members 12 are made of a material having an enhanced high thermal conductivity in the thickness direction thereof, such as CFRP containing fibers oriented in the thickness direction, a resin material filled with filler of high thermal conductivity, a non-magnetic metal or the like. Thus, the first reinforcing members 12 are capable of efficiently transferring the heat of the armature windings 3 to the coolant. By arranging the second reinforcing members 13 formed of a material having with a lower thermal conductivity than that of the first reinforcing members 12, such as resin or the like, between the first reinforcing members 12 and the outer wall of each of the cooling jackets 8a, 8b, 8c and 8d, it is possible to restrain the heat from being transferred to the outer wall, thereby suppressing temperature rise of the outer surfaces of the cooling jackets 8a, 8b, 8c and 8d.

Figure 4:
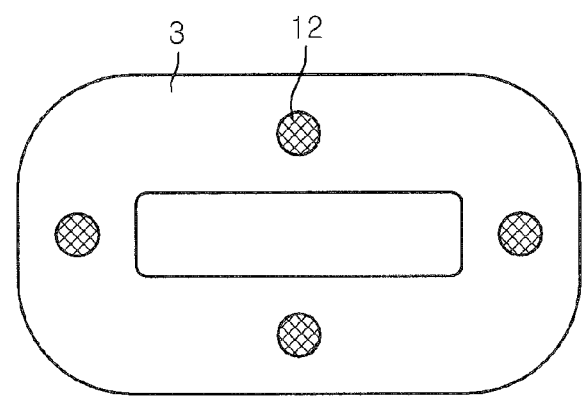
FIG. 4 is a top view showing a positional relationship between the armature windings of the linear motor and the reinforcing member of the cooling jacket unit.

FIG. 4 is a top view illustrating the positional relationship between each of the armature windings of the coolant-cooled linear motor and the first reinforcing members 12 of the cooling jackets with the upper jacket 8a and the second reinforcing members 13 removed.

As shown in FIG. 4, the first reinforcing members 12 have a circular cross section and are arranged in specified positions along the circumference of each of the armature windings 3 (the second reinforcing members 13 are not shown in FIG. 4). This arrangement helps increase the heat transfer area, thereby making it possible to efficiently transfer the heat from the armature windings 3 to the coolant. In addition, such arrangement of the first reinforcing members 12 makes it possible to reliably reinforce the cooling jackets 8a, 8b, 8c and 8d of flat plate shape, each of which has the coolant flow path 11 with a narrow gap. Alternatively, the first reinforcing members 12 may have a rectangular cross section rather than the circular cross section. This also holds true in case of the second reinforcing members 13.

Third Embodiment

Figure 5:
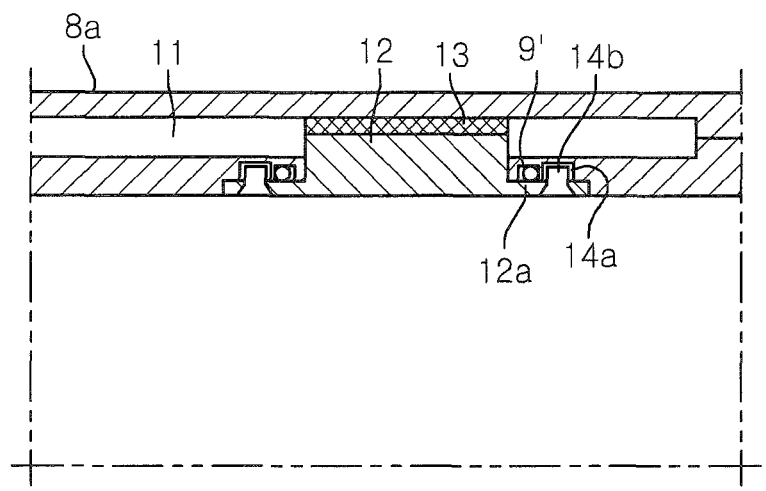
FIG. 5 is an enlarged side section view showing a fixing portion of a reinforcing member in accordance with a third embodiment of the present invention.

FIG. 5 is an enlarged side section view showing a fixing structure of each of the first reinforcing members 12 to one of the first to fourth cooling jackets 8a, 8b, 8c and 8d in accordance with a third embodiment of the present invention, in which the cooling jacket 8a is representatively illustrated.

The third embodiment differs from the second embodiment in that each of the first reinforcing members 12 is provided with a flange portion 12a at a peripheral portion thereof, insertion nuts 14a being fixed to the inner wall of the cooling jacket 8a on the opposite side to the coolant flow path 11 and bolts 14b being tightened to the respective nuts 14a through the flange portion 12a to fix each of the first reinforcing members 12 to the inner wall of the cooling jacket 8a. The first reinforcing members 12, the second reinforcing members 13 and the outer wall of the jacket 8a are adhesively bonded to one another. An O-ring 9' is arranged between the flange portion 12a of each of the first reinforcing members 12 and the inner wall of the cooling jacket 8a to secure fluid-tightness of the coolant flow path 11.

In this way, the first reinforcing members 12 and the cooling jacket 8a are mechanically fixed to each other without resort to bonding. This makes it possible to assure increased fluid tightness of the coolant flow path 11. Any seal members other than the O-ring 9' may be used to secure the fluid-tightness of the coolant flow path 11. Although the nuts 14a are used to fix each of the first reinforcing members 12 to the inner wall of the cooling jacket 8a in the present embodiment, the first reinforcing members 12 may be fixed to the inner wall of the cooling jacket 8a by fixing the bolts 14b directly to the inner wall without using the nuts.

Fourth Embodiment

Figure 6:
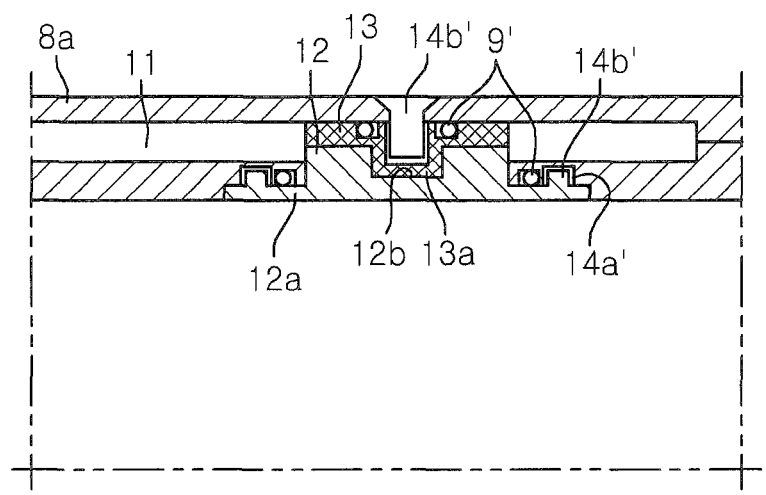
FIG. 6 is an enlarged side section view showing a fixing portion of a reinforcing member in accordance with a fourth embodiment of the present invention.

FIG. 6 is an enlarged side section view showing the fixing structure of each of the second reinforcing members 13 to the first to fourth cooling jackets 8a, 8b, 8c and 8d in accordance with a fourth embodiment of the present invention, in which the cooling jacket 8a is representatively illustrated. The fourth embodiment differs from the third embodiment in that each of the first reinforcing members 12 has a recess portion 12b formed in a surface thereof on the side of the coolant flow path 11, a protrusion portion 13a for engagement with the recess portion 12b being formed in each of the second reinforcing members 13, an insertion nut 14a' being preliminarily fixed in a depressed portion of the protrusion portion 13a by an adhesive agent and a bolt 14b' being tightened to the insertion nut 14a' from the outer wall of the cooling jacket 8a.

This makes it possible to fix the second reinforcing members 13 held between the outer wall of the cooling jacket 8a and the first reinforcing members 12 more reliably and strongly than in the third embodiment. Even if the bolt 14b' is tightened from the outer wall of the cooling jacket 8a, it is possible to restrain the heat from the armature windings 3 from being transferred to the surface of the cooling jacket 8a. The method of fixing each of the first reinforcing members 12 to the inner wall of the cooling jacket 8a remains the same as the method employed in the third embodiment. Further, an O-rings 9' are also used to secure the fluid-tightness of the coolant flow path 11.

Fifth Embodiment

Figure 7:
FIG. 7 is a plan view showing a plurality of reinforcing members in accordance with a fifth embodiment of the present invention, which is arranged inside the cooling jacket unit to be rectilinearly extended along the extension direction of the armature.
Figure 8:
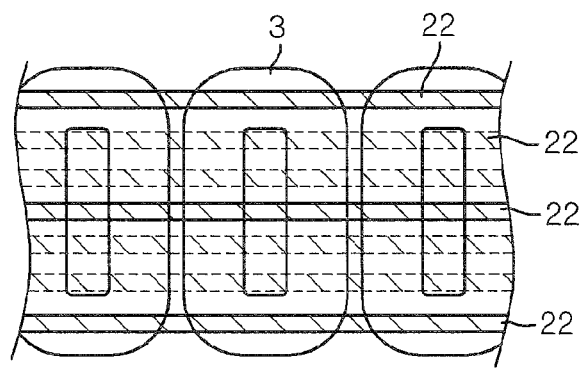
FIG. 8 is an enlarged view of an area designated by "B" in FIG. 7, showing a positional relationship between the reinforcing members and the armature windings.

FIG. 7 is a plan view showing a plurality of third reinforcing members in accordance with a fifth embodiment of the present invention, which is arranged inside each of the cooling jackets to rectilinearly extend along the extension direction of the armature. FIG. 8 is an enlarged view of the area designated by "B" in FIG. 7, showing a positional relationship between the third reinforcing members and the armature windings.

The fifth embodiment differs from the second to fourth embodiments in that, in place of the first reinforcing members 12 and the second reinforcing members 13 of the second to fourth embodiments, a plurality of third reinforcing members 22 rectilinearly extends along the extension direction of the armature 1 and a plurality of coolant flow paths 11 is defined between the third reinforcing portions 22 as shown in FIG. 7. Therefore, the third reinforcing portions 22 are arranged to extend across the armature windings 3 as can be seen in FIG. 8 showing a positional relationship between the third reinforcing portions 22 and the armature windings 3. Each of the third reinforcing members 22 may be formed of two different members having different thermal conductivities such as the first and the second reinforcing members 12 and 13.

By employing the third reinforcing portions 22 provided inside of the cooling jacket 8a (or 8c) to rectilinearly extend along the extension direction of the armature 1 as shown in FIGS. 7 and 8, it is possible to provide a plurality of coolant flow paths 11 unlike the configuration in which the first reinforcing members 12 and the second reinforcing members 13 are arranged along each of the armature windings 3. This results in an increase in the flowing velocity of the coolant and the heat transfer area, consequently making it possible to efficiently transfer the heat from the armature windings 3 to the coolant and to greatly enhance the rigidity of the cooling jacket unit.

Sixth Embodiment

Figure 9:
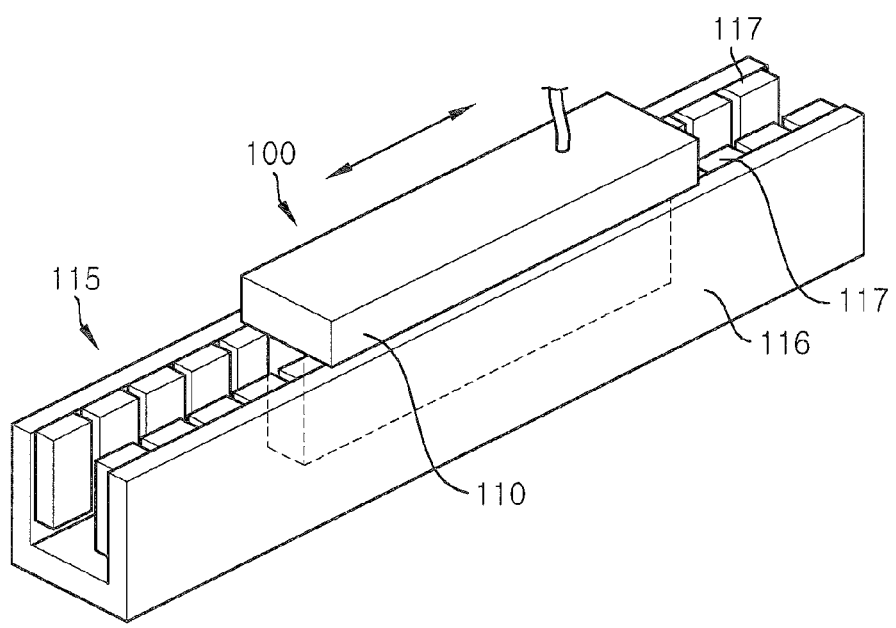
FIG. 9 is a perspective view showing a coolant-cooled linear motor in accordance with a sixth embodiment of the present invention.
Figure 10:
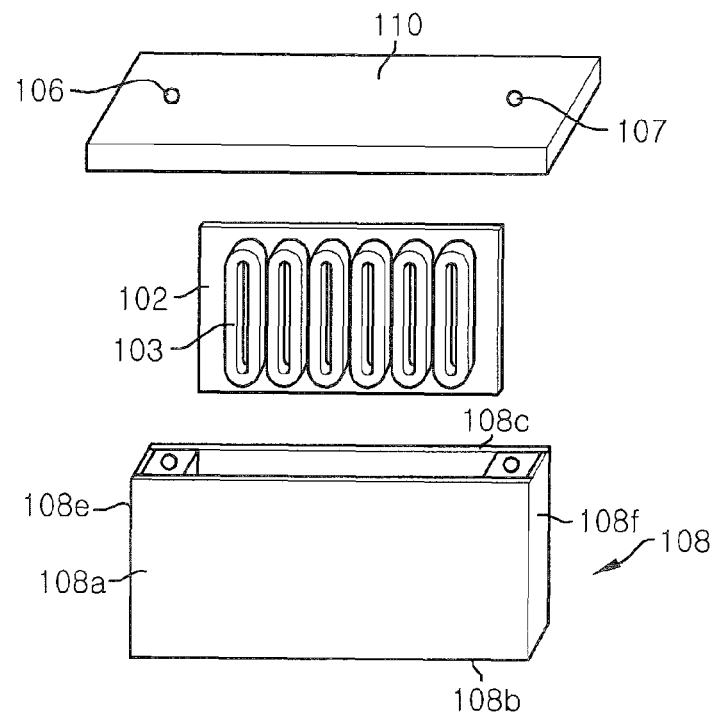
FIG. 10 is an exploded perspective view showing an armature employed in the linear motor of the sixth embodiment.

FIG. 9 is a perspective view showing a coolant-cooled linear motor in accordance with a sixth embodiment of the present invention. In FIG. 9, reference numeral "100" designates an armature, reference numeral "110" designates a base, reference numeral "115" designates a field magnet unit, reference numeral "116" designates a yoke and reference numeral "117" designates field-generating permanent magnets. FIG. 10 is an exploded perspective view showing the armature employed in the linear motor of the sixth embodiment.

The sixth embodiment differs from the first embodiment in that a base 110 of flat shape instead of one of the cooling jackets is arranged on one of the four side faces parallel to the extension direction of the armature. Further, although the armature employed in the linear motor of the first embodiment is a flat type, the armature of the sixth embodiment is a so-called T-type.

Specifically, as shown in FIG. 10, the armature of the coolant-cooled linear motor includes armature windings 103, a cooling jacket unit of box-like shape for accommodating the armature windings 103 and the base 110 of flat plate shape or prismatic columnar shape attached to open end of the cooling jacket unit. The cooling jacket unit includes three cooling jackets 108a, 108b and 108c for defining three side faces of the cooling jacket unit parallel to the extension direction of the armature and two end jacket members 108e and 108f for defining two opposite end faces of the cooling jacket parallel to the extension direction of the armature. It is often the case that the armature windings 103 are bonded to and connected in a substrate 102. In the present embodiment, the armature windings 103 are fixed to the box-shape cooling jacket unit formed of the five jacket members 108a, 108b, 108c, 108e and 108f by bonding or resin-molding. In case where the linear motor has a different fixing structure, it is possible to arrange the jacket members on plural faces and to enhance the temperature reduction performance.

While FIG. 10 shows an exploded perspective view of the armature of the linear motor, no detailed description will be made on the attachment structure of the respective jacket members since it is similar to that in the first embodiment.

Figure 11:
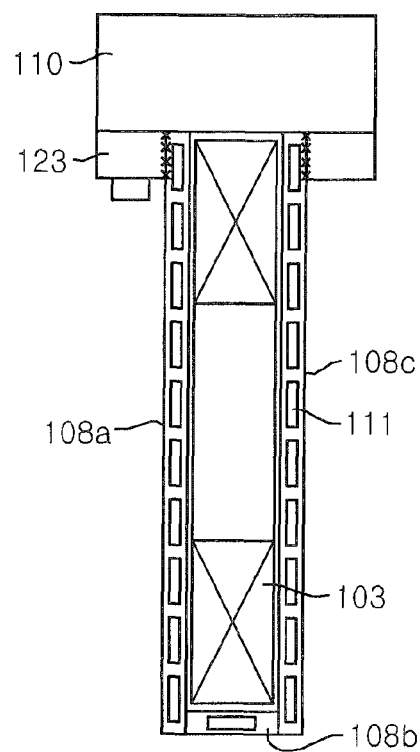
FIG. 11 is a front section view showing the armature of the linear motor of the sixth embodiment, which is in an assembled state.
Figure 12:
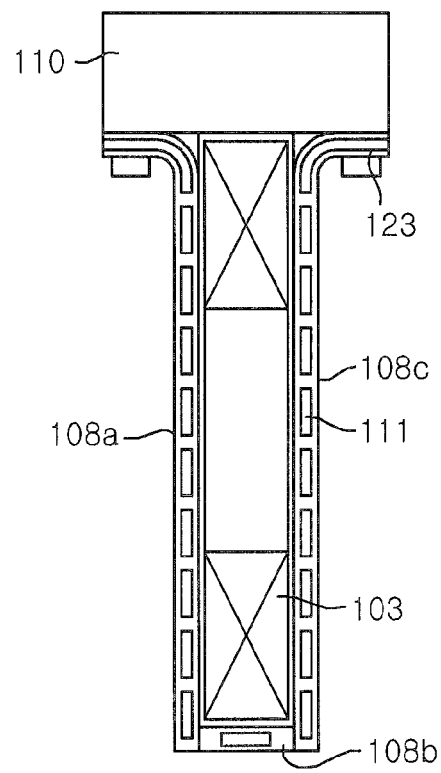
FIG. 12 is a front section view showing another attachment example of a flange portion in the armature of the linear motor.

FIG. 11 is a front section view showing the armature of the linear motor of the sixth embodiment, which is in an assembled state. FIG. 12 is a front section view showing another attachment example of a flange portion in the armature of the linear motor shown in FIG. 11.

In the armature of the coolant-cooled linear motor shown in FIG. 11, the box-shaped cooling jacket unit is adhesively fixed to the base 110 through a flange 123 as a separate member.

Alternatively, as opposed to the configuration shown in FIG. 11 in which the box-shaped cooling jacket unit is adhesively fixed to the flange 123, FIG. 12 shows an example in which the box-shaped cooling jacket unit and the flange 123 are integrally formed with each other using, e.g., CFRP. As compared with the configuration shown in FIG. 11, the configuration shown in FIG. 12 is capable of increasing the strength of the armature. In the corner portions of the cooling jacket unit, carbon fibers are arranged in the direction perpendicular to the thrust force direction so that the mass of the armature can be sufficiently supported even if the armature is used in a horizontal posture.

Seventh Embodiment

Figure 13:
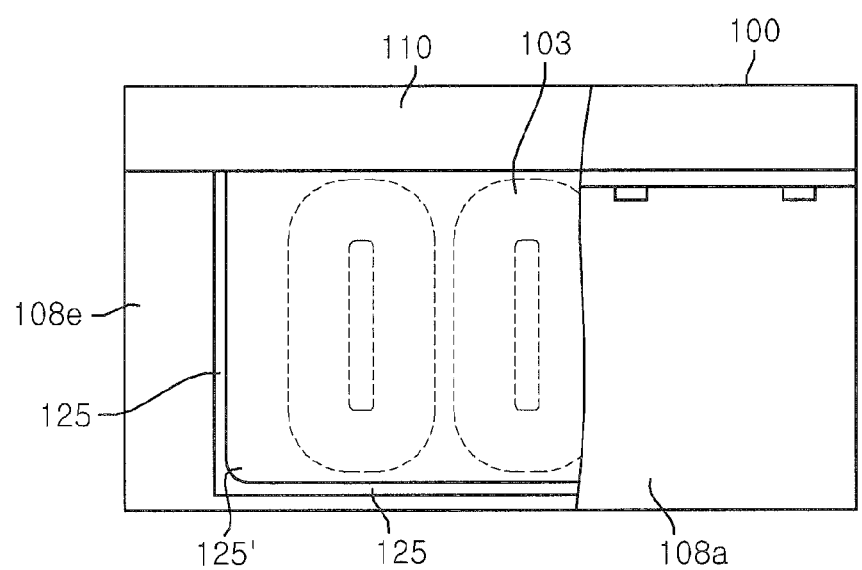
FIG. 13 is a side section view showing an armature of a coolant-cooled linear motor in accordance with a seventh embodiment of the present invention.
Figure 14:
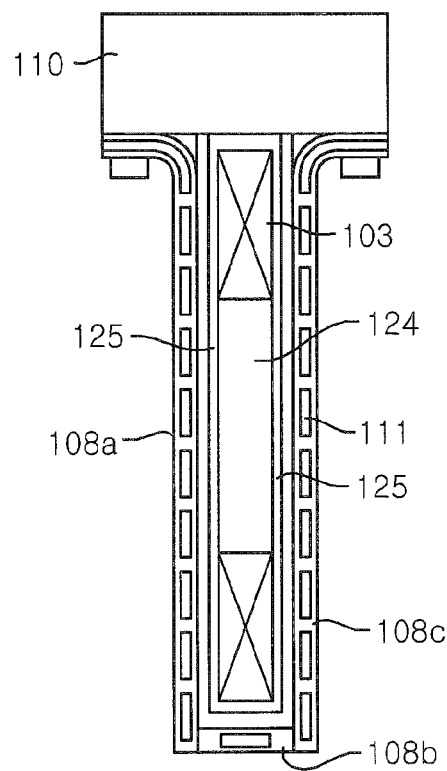
FIG. 14 is a front section view of the armature shown in FIG. 13.

FIG. 13 is a side section view showing an armature of a coolant-cooled linear motor in accordance with a seventh embodiment of the present invention. FIG. 14 is a front section view of the armature shown in FIG. 13. The seventh embodiment differs from the sixth embodiment in that, as shown in FIGS. 13 and 14, the armature windings 103 and the base 110 are preliminarily unified by a resin molding 124 and then covered with the box-shaped cooling jacket unit 108.

More specifically, air gaps 125 are provided between the resin molding 124 and the left, right and lower cooling jackets 108a, 108b and 108c as can be seen in FIG. 1. An air gap 125 is also provided between the resin molding 124 and the end jacket member 108e as can be seen in FIG. 13. A sealant or an elastic resin 125' having high thermal conductivity is filled in the air gaps 125.

Provision of the air gaps 125 between the resin molding 124 and the cooling jacket unit 108 in the seventh embodiment as shown in FIGS. 13 and 14 makes sure that, even if the resin molding 124 is expanded due to a sharp increase in the temperature of the armature windings 103, the expansion can be absorbed by the air gaps 125. This eliminates the possibility that stresses are applied to the cooling jacket unit 108. Moreover, the sealant or the elastic resin of high thermal conductivity filled in the air gaps 125 between the resin molding 124 and the cooling jacket unit 108 helps to increase the heat transfer from the armature windings 103 to the coolant, which makes it possible to avoid reduction in the cooling efficiency. This broadens the permissible range of temperature rise in the armature windings 103, consequently improving the thrust force performance of the linear motor.

Eighth Embodiment

Figure 15:
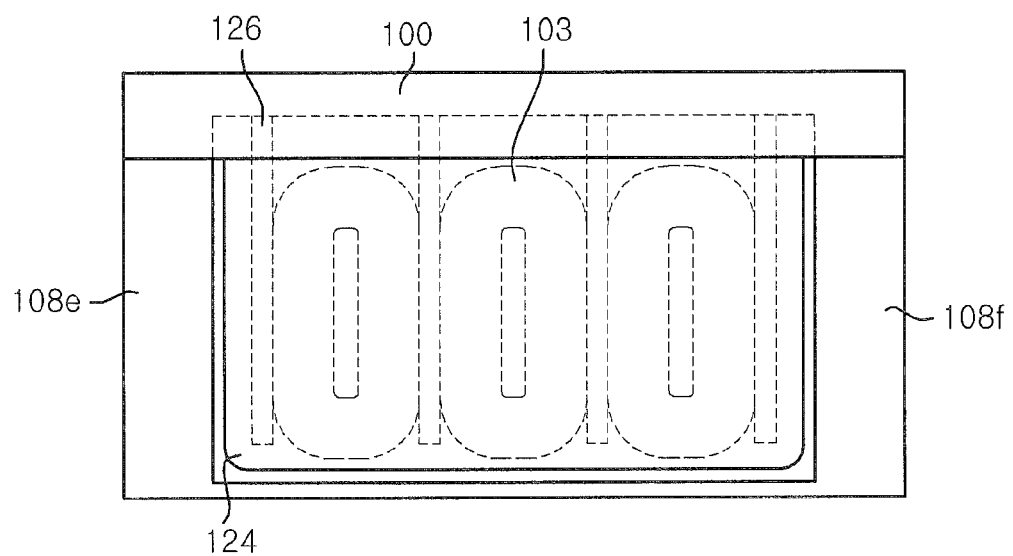
FIG. 15 is a side section view showing an armature of a coolant-cooled linear motor in accordance with an eighth embodiment of the present invention.

FIG. 15 is a side section view showing an armature of a coolant-cooled linear motor in accordance with an eighth embodiment of the present invention. The eighth embodiment differs from the sixth and seventh embodiments in that, in the coolant-cooled linear motor mounted with a cooling jacket unit having a plurality of coolant flow paths therein, fourth reinforcing members 126 are provided between the opposite side surfaces of the armature windings 103 and the base 110 and are fixed to the armature windings 103 by a resin molding 124.

In the eighth embodiment, as shown in FIG. 15, the fourth reinforcing members 126 are provided between the opposite side surfaces of the armature windings 103 and the base 110. This makes it possible to enhance the rigidity and vibration resistance of the armature. By arranging the fourth reinforcing members 126 between the armature windings 103 as well as at the longitudinal opposite ends of the armature, it is possible to expect a further enhanced reinforcing effect.

Ninth Embodiment

Figure 16:
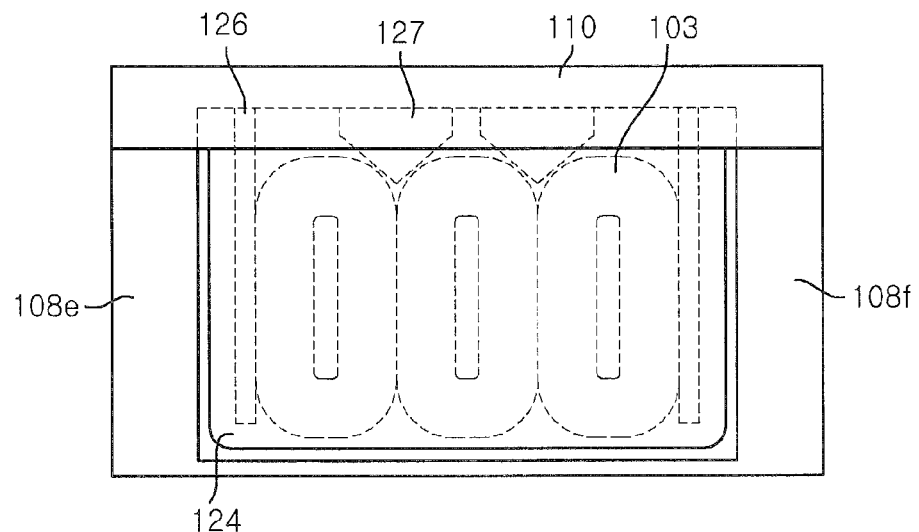
FIG. 16 is a side section view showing an armature of a coolant-cooled linear motor in accordance with a ninth embodiment of the present invention.

FIG. 16 is a side section view showing an armature of a coolant-cooled linear motor in accordance with a ninth embodiment of the present invention. The ninth embodiment differs from the eighth embodiment in that, in the coolant-cooled linear motor mounted with a cooling jacket unit having a plurality of coolant flow paths therein, fifth reinforcing members 127 each having a substantially V-shaped tip end are arranged between upper spaces between the adjacent wirings and the base 110 and are fixed to the armature windings 103 by a resin molding 124.

Provision of the fifth reinforcing members 127 between the upper inter-wiring spaces the base 110 in the ninth embodiment as shown in FIG. 16 makes sure that the rigidity and vibration resistance of the armature can be enhanced even when the reinforcing members cannot be provided between the armature windings 103 due to the narrow gap thereof.

Tenth Embodiment

Figure 17:
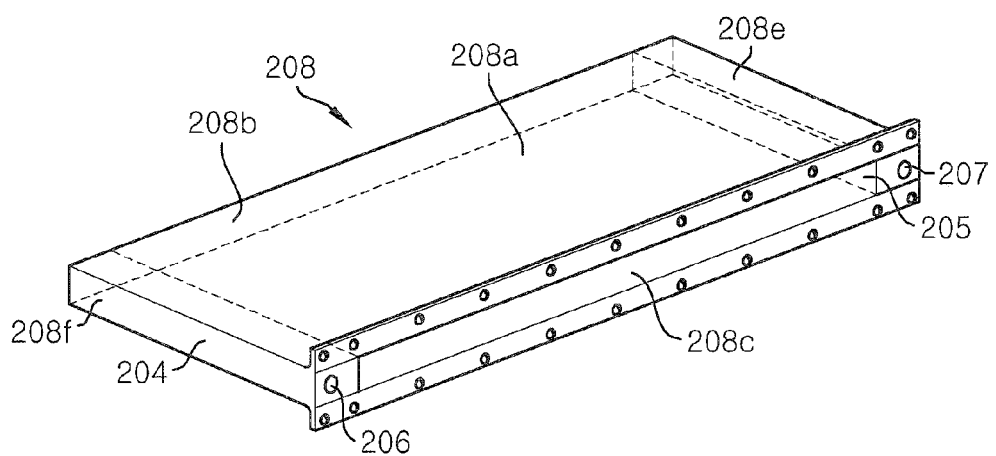
FIG. 17 is a perspective view showing a cooling jacket unit in accordance with a tenth embodiment of the present invention.
Figure 18A:
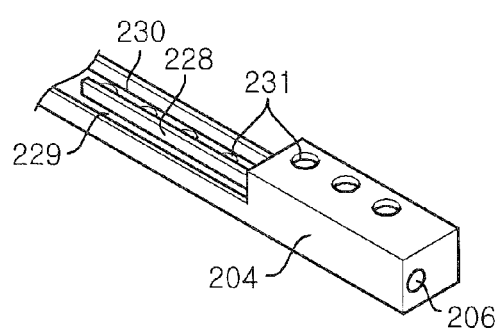
FIG. 18A is an exploded perspective view showing a first block with a coolant inlet as one of constituent parts of the cooling jacket unit shown in FIG. 17.
Figure 18B:
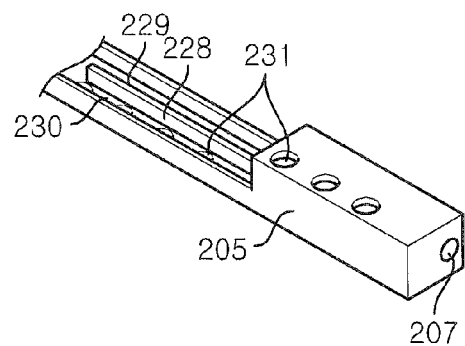
FIG. 18B is an exploded perspective view showing a second block with a coolant outlet as another of constituent parts of the cooling jacket unit shown in FIG. 17.
Figure 19:
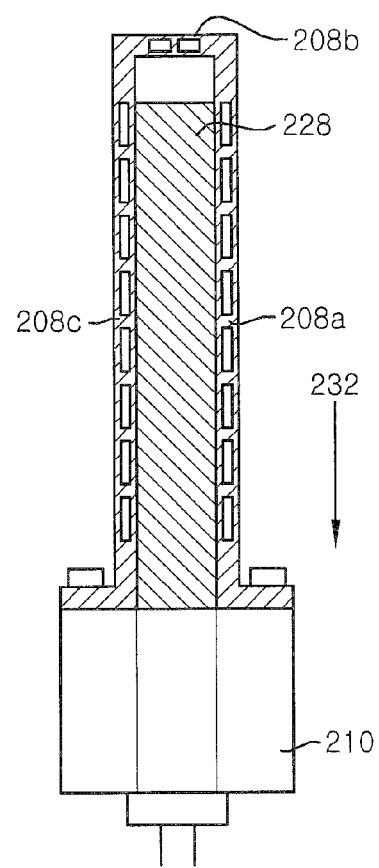
FIG. 19 is a front section view showing an armature in accordance with the tenth embodiment of the present invention, in which the attachment direction of the armature is restricted.

FIG. 17 is a perspective view showing a cooling jacket unit in accordance with a tenth embodiment of the present invention. FIG. 18A is an exploded perspective view showing a first block 204 with a coolant inlet 206, and FIG. 18B is an exploded perspective view showing a second block 205 with a coolant outlet 207, the first and the second bock 204 and 205 being constituent parts of the cooling jacket unit shown in FIG. 17. FIG. 19 is a front section view showing an armature in accordance with the tenth embodiment of the present invention, in which the attachment direction of the armature is reversed to that in the sixth embodiment. The tenth embodiment is presented to more specifically describe the sixth embodiment shown in FIG. 10.

As shown in FIG. 17, the cooling jacket unit 208 of the tenth embodiment includes the first block 204 with the coolant inlet 206 and the second block 205 with the coolant outlet 207, both of which are arranged at longitudinal opposite end portions of the cooling jacket unit 208. Each of the first block 204 and the second block 205 is provided with a partition plate 228 for temporarily baffling the flow of the coolant, a coolant pool portion 229 and a coolant communication groove 230. In other words, the tenth embodiment employs a labyrinth structure capable of assuring smooth inflow and outflow of the coolant.

Next, description will be made on the operation of the first block 204 and the second block 205.

Referring to FIG. 17, the coolant introduced from the coolant inlet 206 of the first block 204 is first accumulated in the coolant pool portion 229 of the first block 204. Then, as can be seen in FIG. 18A, the coolant flows over the partition plate 228 toward the coolant communication groove 230. The coolant is distributed to the first cooling jacket 208a, the second cooling jacket 208b and the third cooling jacket 208c through coolant communication holes 231. Thereafter, the coolant is gathered in the coolant communication groove 230 through the coolant communication holes 231 of the second block 205 shown in FIG. 18B. The coolant thus gathered flows over the partition plate 228 and is discharged from the coolant outlet 207 through the coolant pool portion 209. In other words, the coolant cannot be discharged toward the coolant outlet 207 unless it does not flow over the partition plate 228 provided in the second block 205.

Further, as shown in FIG. 19, the partition plate 28 is extended to a height higher than the coolant communication holes 231. Thus, the coolant is filled in the entire flow paths. Likewise, the second cooling jacket 208b can be filled with the coolant by adjusting the height of the partition plate 228. The labyrinth structure mentioned above is provided in the coolant outlet side as well as in the coolant inlet side. Therefore, the coolant is filled in the entire flow paths under the same principle even when the coolant inlet is interchanged with the coolant outlet. This can contribute in standardizing the components and improving the ease of work.

The forgoing description is directed to a case where the armature is attached in the posture shown in FIG. 19. If the attachment posture of the armature is turned over, the coolant inlet and the coolant outlet are positioned at positions higher than the entire flow paths. In this case, the coolant is filled in the entire flow paths regardless of the labyrinth structure. This makes it possible to arbitrarily set the attachment posture of the armature.

Eleventh Embodiment

Figure 20:
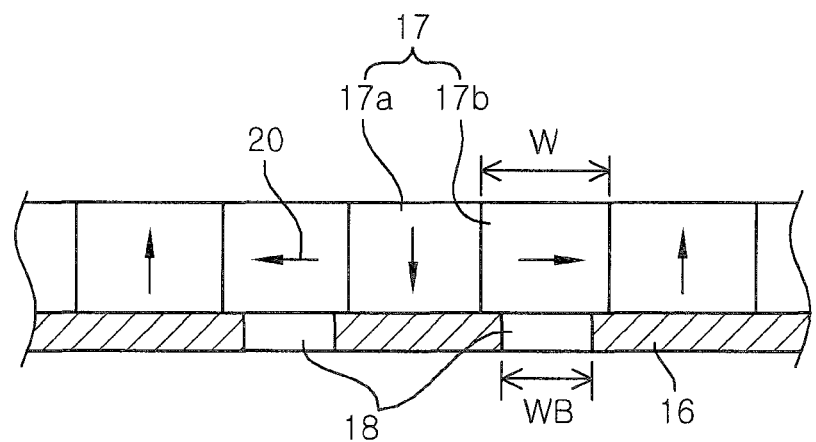
FIG. 20 is a plan section view showing a field magnet unit of a linear motor in accordance with an eleventh embodiment of the present invention.

FIG. 20 is a plan section view showing a field magnet unit of a linear motor in accordance with an eleventh embodiment of the present invention. In FIG. 20, reference numeral '16' designates a yoke, reference numeral '17' designates field-generating permanent magnets, reference numeral '17a' designates main pole magnets, reference numeral '17b' designates auxiliary pole magnets, and reference numeral '18' designates air gaps. Allows '20' designate the directions of magnetic fields.

The field-generating permanent magnets 17 have a Halbach array structure in which the main pole magnets 17a and the auxiliary pole magnets 17b are alternately arranged on the yoke 16 along the extension direction of the armature. The air gaps 18 having a width WB smaller than the width W of the auxiliary pole magnets 17b are formed in the areas of the yoke 16 corresponding to the auxiliary pole magnets 17b.

Figure 21:
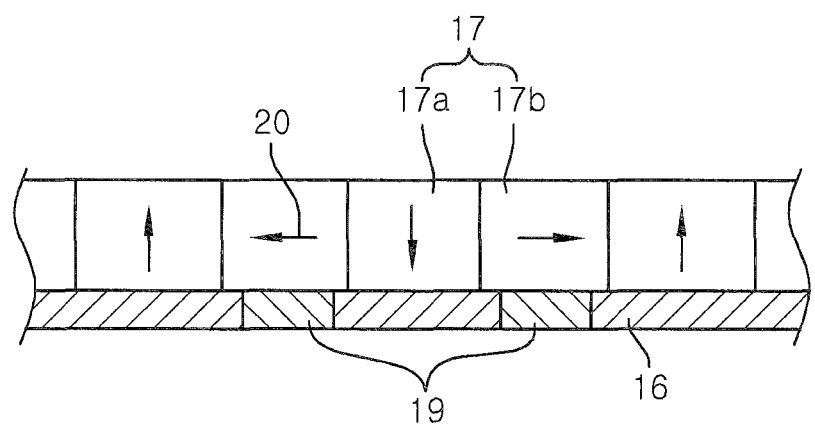
FIG. 21 is a plan section view showing another example of the field magnet unit of the linear motor in accordance with the eleventh embodiment of the present invention.

FIG. 21 is a plan section view showing another example of the field magnet unit of the linear motor in accordance with the eleventh embodiment of the present invention. In FIG. 21, reference numeral '19' designates non-magnetic members.

In the field magnet unit shown in FIG. 21, non-magnetic members 19 made of a material different from those of the permanent magnets 17 and the yoke 16 are used in place of the air gaps 18 of the yoke 16 shown in FIG. 20.

With the eleventh embodiment configured as above, it is possible to make the field magnet unit lightweight without impairing the thrust force enhancing characteristics and the thrust force variation reducing characteristics of the linear motor having the field magnet unit of Halbach array structure. In addition, it is possible to provide a linear motor capable of reducing the heat generation quantity of the armature.

The non-magnetic members 19 may be made of any material lighter than the yoke 16 and the permanent magnets 17, e.g., resins, ceramics or metals such as titanium and the like.

Although the embodiments of the present invention have been separately described above, combinations of two or more of the first to the eleventh embodiments may be made.

While the invention has been shown and described with respect to the embodiments, it will be understood by those skilled in the art that various changes and modification may be made without departing from the scope of the invention as defined in the following claims.

What is claimed is:

1. A coolant-cooled linear motor, comprising:
    an armature including armature windings and a cooling jacket unit arranged to surround the armature windings, the cooling jacket unit including four cooling jackets defining four side faces parallel to the extension direction of the armature and two end blocks defining two opposite end faces in the extension direction of the armature, the cooling jackets and the end blocks being connected to one another in a box shape, each of the cooling jackets having an internal space to be supplied with a coolant, wherein each of the cooling jackets includes an inner wall and an outer wall defining the internal space; and
    a field magnet unit including a yoke made of a ferromagnetic material and permanent magnets arranged on the yoke, one of the armature and the field magnet unit making relative movement with respect to the other.

2. The motor of claim 1, wherein each of the cooling jackets has a flat plate shape and includes a plurality of coolant flow paths defined therein.

3. The motor of claim 1, wherein each of the cooling jackets is made of a fiber-reinforced plastic, ceramic or nonmagnetic stainless steel.

4. The motor of claim 1, wherein the end blocks respectively include a coolant inlet and a coolant outlet.

5. The motor of claim 1, wherein first reinforcing members are provided in the inner wall and second reinforcing members are provided between the outer wall and the respective first reinforcing members, the first reinforcing members being higher in thermal conductivity than the inner wall, the second reinforcing members being lower in thermal conductivity than the first reinforcing member.

6. The motor of claim 5, wherein the first reinforcing members and the corresponding second reinforcing members are adhesively fixed to each other.

7. The motor of claim 6, wherein each of the first reinforcing members includes a flange portion formed at a peripheral portion thereof, insertion nuts fixed to the inner wall of each of the cooling jackets and bolts tightened to the corresponding insertion nuts through the flange portion to fix the first reinforcing member to the inner wall of each of the cooling jackets.

8. The motor of claim 7, wherein each of the first reinforcing members includes a flow path side surface and a recess portion formed on the flow path side surface, each of the second reinforcing members includes a protrusion portion for engagement with the recess portion of the corresponding first reinforcing member, an additional insertion nut is adhesively fixed to the protrusion portion, and a bolt is tightened to the additional insertion nut from the outer wall of the corresponding cooling jackets.

9. The motor of claim 5, wherein the first reinforcing members and the second reinforcing members are arranged in specified positions along the circumference of each of the armature windings.

10. The motor of claim 5, wherein the first reinforcing members and the second reinforcing members are arranged to be extended in the extension direction of the armature across the armature windings.

11. The motor of claim 5, wherein each of the first reinforcing members is made of a fiber-reinforced plastic containing fibers oriented in the thickness direction, a resin material filled with filler of high thermal conductivity or a nonmagnetic metal.

12. The motor of claim 4, wherein each of the first block and the second block has a labyrinth structure with a partition plate for baffling the flow of the coolant.

13. The motor of claim 1, wherein the permanent magnets include main pole magnets and auxiliary pole magnets alternately arranged on the yoke along the extension direction of the armature to have a Halbach array structure.

14. The motor of claim 1, wherein the yoke includes air gaps formed in alignment with the auxiliary pole magnets, the air gaps having a width smaller than the width of the auxiliary pole magnets.

15. The motor of claim 14, wherein the yoke includes non-magnetic members arranged in the air gaps and made of a material different from those of the permanent magnets and the yoke.

16. A coolant-cooled linear motor, comprising:
    an armature including armature windings and a cooling jacket unit arranged to surround the armature windings, the cooling jacket unit including three cooling jackets defining three side faces parallel to the extension direction of the armature, a base of flat plate shape defining one side face parallel to the extension direction of the armature and two end blocks defining two opposite end faces in the extension direction of the armature, the cooling jackets and the end blocks being connected to one another in a box shape, each of the cooling jackets having an internal space to be supplied with a coolant, wherein each of the cooling jackets includes an inner wall and an outer wall defining the internal space; and
    a field magnet unit including a yoke made of a ferromagnetic material and permanent magnets arranged in the yoke, one of the armature and the field magnet unit making relative movement with respect to the other.

17. The motor of claim 16, wherein the cooling jacket unit further includes flanges connecting the cooling jackets to the base.

18. The motor of claim 17, wherein the cooling jackets and the flanges are integrally made of carbon fibers.

19. The motor of claim 16, wherein the armature windings and the base are preliminarily integrated by a resin molding and then covered by the cooling jackets with air gaps left between the base and the cooling jackets, the air gaps being filled with a sealant or an elastic resin having increased thermal conductivity.

20. The motor of claim 19, wherein the armature further includes reinforcing members arranged between the armature windings and the base.

* * * * *